United States Patent
Kambara

(10) Patent No.: US 11,984,758 B2
(45) Date of Patent: May 14, 2024

(54) IN-VEHICLE BACKUP POWER SOURCE CONTROL APPARATUS AND IN-VEHICLE BACKUP POWER SOURCE APPARATUS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventor: Hisanori Kambara, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 348 days.

(21) Appl. No.: 17/299,617

(22) PCT Filed: Nov. 27, 2019

(86) PCT No.: PCT/JP2019/046262
§ 371 (c)(1),
(2) Date: Jun. 3, 2021

(87) PCT Pub. No.: WO2020/116260
PCT Pub. Date: Jun. 11, 2020

(65) Prior Publication Data
US 2022/0021233 A1 Jan. 20, 2022

(30) Foreign Application Priority Data
Dec. 3, 2018 (JP) .................................. 2018-226488

(51) Int. Cl.
*H02J 9/06* (2006.01)
*B60L 50/60* (2019.01)
(Continued)

(52) U.S. Cl.
CPC .............. *H02J 9/061* (2013.01); *B60L 50/60* (2019.02); *H01M 10/44* (2013.01); *H01M 10/48* (2013.01);
(Continued)

(58) Field of Classification Search
CPC .................................. H02J 9/06; B60L 50/60
See application file for complete search history.

(56) References Cited

U.S. PATENT DOCUMENTS 5,563,479 A * 10/1996 Suzuki .................... B60L 50/60
388/811
10,916,962 B2 * 2/2021 Hida ......................... H02J 7/14
(Continued)

FOREIGN PATENT DOCUMENTS

JP      2000-032685 A      1/2000
JP      2003-235174 A      8/2003

OTHER PUBLICATIONS

International Search Report, Application No. PCT/JP2019/046262, dated Dec. 24, 2019. ISA/Japan Patent Office.

*Primary Examiner* — Adi Amrany
(74) *Attorney, Agent, or Firm* — Honigman LLP

(57) ABSTRACT

A configuration that can increase the reliability of a backup operation is realized in a simpler manner. An in-vehicle backup power source control apparatus includes a first control unit that causes a charge/discharge unit (first discharge unit) to perform a first discharge operation when power supply that is based on a power source unit enters a failure state, and a second control unit that causes a second discharge unit to perform a second discharge operation when power supply that is based on the power source unit enters a failure state and at least the first discharge operation performed by the charge/discharge unit is in an abnormal state.

7 Claims, 7 Drawing Sheets

(51) Int. Cl.
*H01M 10/44* (2006.01)
*H01M 10/48* (2006.01)
*H02J 7/00* (2006.01)
*H02J 7/34* (2006.01)

(52) U.S. Cl.
CPC .............. *H02J 7/0063* (2013.01); *H02J 7/34* (2013.01); *H01M 2220/20* (2013.01)

(56) References Cited

U.S. PATENT DOCUMENTS

| | | | |
|---|---|---|---|
| 2012/0025768 A1* | 2/2012 | Nakano | H02J 7/345 320/116 |
| 2016/0129864 A1* | 5/2016 | Essenmacher | F16D 23/12 307/9.1 |
| 2018/0015891 A1* | 1/2018 | Taniguchi | F02N 11/0866 |
| 2019/0071039 A1* | 3/2019 | Tsukamoto | H02J 7/342 |
| 2019/0103758 A1 | 4/2019 | Fukae | |
| 2019/0337475 A1 | 11/2019 | Kawamura | |
| 2020/0023794 A1 | 1/2020 | Maekawa | |
| 2021/0229610 A1* | 7/2021 | Shimamoto | H02J 7/34 |

* cited by examiner

IN-VEHICLE BACKUP POWER SOURCE CONTROL APPARATUS AND IN-VEHICLE BACKUP POWER SOURCE APPARATUS

CROSS-REFERENCE TO RELATED APPLICATIONS

This application is the U.S. national stage of PCT/JP2019/046262 filed on Nov. 27, 2019, which claims priority of Japanese Patent Application No. JP 2018-226488 filed on Dec. 3, 3018, the contents of which are incorporated herein.

TECHNICAL FIELD

The present disclosure relates to an in-vehicle backup power source control apparatus and an in-vehicle backup power source apparatus.

BACKGROUND

Heretofore, in-vehicle backup power source apparatuses are known. The backup power source apparatus (backup power source apparatus 8) described in JP 2003-235174A includes the power source input unit 9, the output unit 10, the capacitor unit 11, the charging circuit unit 12, the step-up circuit unit 13, and the control unit 21, for example. In this backup power source apparatus 8, the charging circuit unit 12 charges, in advance, the capacitor unit 11 using power supplied from the power source input unit 9 in accordance with an instruction from the control unit 21. Based on the voltage of the power source input unit 9 having dropped below a threshold value, the charging voltage stored in the capacitor unit 11 is stepped up by the step-up circuit unit 13 and is output from the output unit 10, in accordance with an instruction from the control unit 21.

However, the backup power source apparatus 8 of JP 2003-235174A includes only a single backup path, and thus there is a risk that, if an abnormality (malfunction, etc.) occurs in a component that constitutes the backup path or a related component, a backup operation cannot be performed when necessary.

The present disclosure has been made in order to solve at least one of the above-described issues, and aims to realize a configuration that can increase the reliability of a backup operation in a simpler manner.

SUMMARY

An in-vehicle backup power source control apparatus according to a first aspect of the present disclosure controls power supply from a power storage unit, in an in-vehicle power source system that includes a power source unit and the power storage unit and in which power from the power source unit is supplied to a power supply target via a power path. The apparatus includes: a first discharge unit that performs a first discharge operation of supplying a discharge current that is based on power supply from the power storage unit, to the power path via a first discharge path; a second discharge unit that performs a second discharge operation of supplying a discharge current that is based on power supply from the power storage unit, toward the power supply target via a second discharge path that is different from the first discharge path; a first control unit that causes the first discharge unit to perform the first discharge operation when power supply that is based on the power source unit enters a failure state; and a second control unit that causes the second discharge unit to perform the second discharge operation when power supply that is based on the power source unit enters the failure state and at least the first discharge operation that is performed by the first discharge unit is in an abnormal state.

An in-vehicle backup power source apparatus according to a second aspect of the present disclosure includes: the in-vehicle backup power source control apparatus according to the first aspect, and the power storage unit.

Advantageous Effects of Disclosure

When power supply that is based on the power source unit enters a failure state, the in-vehicle backup power source control apparatus according to the first aspect causes the first discharge unit to perform the first discharge operation. When this first discharge operation is performed, it is possible to supply, to the power path, power that is based on the power storage unit, and continue supplying power to the power supply target.

Furthermore, even when the first discharge operation performed by the first discharge unit enters an abnormal state, the in-vehicle backup power source control apparatus according to the first aspect can cause the second discharge unit to perform the second discharge operation and supply power to the power supply target using a path that is different from the first discharge unit. Thus, the reliability of a backup operation increases significantly. Moreover, also when a backup operation is performed by the second discharge unit, the same power storage unit for when a backup operation is performed by the first discharge unit can be used as a power supply source, and thus the above effects can be achieved while suppressing an increase in the number of components.

In this manner, according to the in-vehicle backup power source control apparatus of the first aspect, it is possible to realize a configuration that can increase the reliability of a backup operation in a simpler manner.

According to the in-vehicle backup power source apparatus of the second aspect, it is possible to achieve the same effects as the in-vehicle backup power source control apparatus of the first aspect.

DESCRIPTION OF EMBODIMENTS

Figure 1:
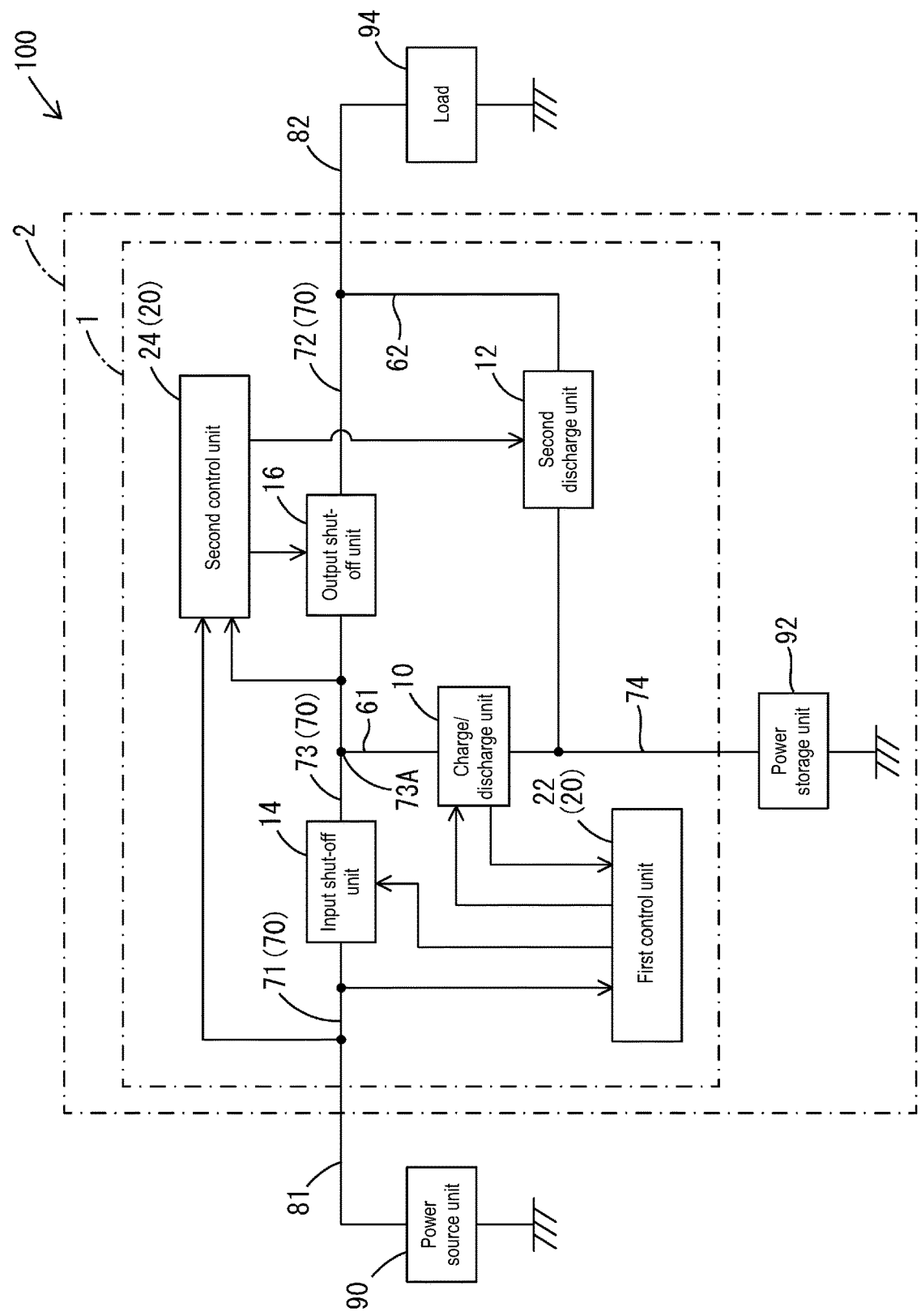
FIG. 1 is a circuit diagram schematically showing an in-vehicle power source system that includes a backup power source control apparatus according to a first embodiment.

Preferred embodiments of the present disclosure will be described.

The first control unit and the second control unit may operate independently from each other.

According to this configuration, even when the first discharge operation is not performed in a normal manner due to an abnormality caused by the first control unit (for example, a malfunction of the first control unit), the second control unit can independently control the second discharge unit to perform the second discharge operation.

A switch unit that switches between an on-state and an off-state may be provided on the power path on the power supply target side relative to a connection portion of the first discharge path. Also, the switch unit may permit power supply from the power source unit side to the power supply target side in an the-state, and shut off power supply from the power source unit side to the power supply target side in the off-state. The second discharge path may be electrically connected on the power supply target side relative to the switch unit on the power path, and when power supply that is based on the power source unit enters the failure state and at least the first discharge operation that is performed by the first discharge unit is in the abnormal state, the second control unit may switch the switch unit to the off-state.

According to this configuration, when the first discharge operation enters an abnormal state, it is possible to switch the switch unit to the off-state, and electrically disconnect the power source unit side and the power supply target side of the switch unit on the power path. Therefore, when a discharge current is supplied to the power supply target side relative to the switch unit on the power path by performing the second discharge operation, it is possible to supply a discharge current in a stable manner without being affected by the power source unit side relative to the switch unit on the power path.

A capacitor that is electrically connected to the power path, and is charged based on power supplied from the power source unit may be included.

According to this configuration, when a malfunction such as an open circuit or the like occurs on the power source unit side and power supply ceases, power can be immediately suppled from the capacitor to the power supply target. Therefore, there is an increase in the likelihood of power supply to the power supply target being maintained during a period from when power supply that is based on the power source unit ceases until when a backup operation is started by the first discharge unit or the second discharge unit.

A low-dropout regulator that has one end electrically connected to the power storage unit and another end electrically connected to the power path, and that steps down an input voltage that depends on a charging voltage of the power storage unit and applies an output voltage to the power path, when power supply that is based on the power source unit enters the failure state may be included.

According to this configuration, when a malfunction of open circuit or the like occurs on the power source unit side and power supply ceases, power can be immediately supplied to the power supply target by the low-dropout regulator. Therefore, there is an increase in the likelihood of power supply to the power supply target being maintained during a period from when power supply that is based on the power source unit ceases until when a backup operation is started by the first discharge unit or the second discharge unit. Note that, during a period in which the voltage of the power path exceeds a predetermined voltage (a voltage corresponding to the difference in potential at which a step-down operation is started by the low-dropout regulator), a step-down operation is not performed by the low-dropout regulator, and thus, during this period, discharge of the power storage unit performed by the low-dropout regulator is suppressed.

When power supply that is based on the power source unit enters the failure state, the second control unit may operate so as to cause the second discharge unit to start the second discharge operation before the first discharge unit starts the first discharge operation in accordance with control performed by the first control unit.

According to this configuration, after the failure state occurs, a backup operation can be started by the second discharge unit before the first discharge unit starts the first discharge operation. Thus, compared with a configuration in which a backup operation is performed only by the first discharge unit, a time lag from when the failure state occurs until when a backup operation is started can be shortened.

The first discharge unit may be a voltage conversion unit that steps up or down an input voltage that depends on a charging voltage of the power storage unit, and applies a predetermined output voltage to the first discharge path. The second discharge unit may be a switch that permits conduction from the power storage unit side to the power supply target side in an on-state, and shuts off conduction from the power storage unit to the power supply target in an off-state. The second control unit may operate so as to cause the second discharge unit to start the second discharge operation when power supply that is based on the power source unit enters the failure state, and stop the second discharge operation when the first discharge unit starts the first discharge operation during the second discharge operation.

According to this configuration, a backup operation can be performed such that the first discharge unit outputs the predetermined output voltage when the failure state occurs. Moreover, if the second discharge unit starts the second discharge operation before the first discharge unit starts the first discharge operation, a time lag from when the failure state occurs until when a backup operation is started can be shortened, and if the first discharge operation is started after the second discharge operation is started, and the second discharge operation is then stopped, a subsequent backup operation can be integrated with the first discharge operation.

Embodiments of the present disclosure will be described below.

First Embodiment

FIG. 1 schematically shows a circuit diagram of an in-vehicle power source system 100 that includes an in-vehicle backup power source control apparatus 1 (hereinafter, also referred to as a "backup power source control apparatus 1") according to a first embodiment. The in-vehicle power source system 100 includes a power source unit 90 that serves as a main power source for supplying power to a load 94 (power supply target), a power storage unit 92 that serves as a power supply source when power supply from at least the power source unit 90 ceases, and the backup power source control apparatus 1 that has a function of promptly discharging the power storage unit 92 when power supply from the power source unit 90 ceases, and the in-vehicle power source system 100 is configured as a system that supplies power to the load 94 using the power source unit 90 or the power storage unit 92 as a power supply source. In addition, an in-vehicle backup power source apparatus 2 is configured to include the backup power source control apparatus 1 and the power storage unit 92.

This in-vehicle power source system 100 is configured to supply power from the power source unit 90 to the load 94 via a first conductive path 71, a second conductive path 72, and a third conductive path 73, which are provided in the backup power source control apparatus 1, when power supply from the power source unit 90 is in a normal state. With this configuration, "when power supply from the power source unit 90 is in a normal state" refers to a case where an output voltage of the power source unit 90 exceeds a "predetermined value (a first threshold voltage Vth1)", specifically a case where a voltage that is applied to the first conductive path 71 based on the output voltage of the power source unit 90 exceeds the "predetermined value (the first threshold voltage Vth1)".

The backup power source control apparatus 1 is an apparatus that uses, as a backup power source, the power storage unit 92 that is charged based on power supply from the power source unit 90, and controls a discharge operation of the power storage unit 92. A configuration is adopted in which this backup power source control apparatus 1 includes a charge/discharge unit 10 (first discharge unit) and a second discharge unit 12, causes the charge/discharge unit 10 or the second discharge unit 12 to switch between discharge and discharge stop of the power storage unit 92, and can supply power from the power storage unit 92 to the load 94 during discharge.

The power source unit 90 functions as a main power source, and is configured as a known in-vehicle battery such as a lead battery. The high-potential terminal of the power source unit 90 is electrically connected to a first wire 81, and the power source unit 90 applies a predetermined output voltage to the first wire 81. The output voltage when the power source unit 90 is fully charged is set to a value larger than 0 V.

The power storage unit 92 functions as an auxiliary power source, and is constituted by a known power storage means such as an electric double layer capacitor (EDLC). The power storage unit 92 is electrically connected to the charge/discharge unit 10 via a fourth conductive path 74, and is charged by the charge/discharge unit 10. In addition, the power storage unit 92 is electrically connected to the charge/discharge unit 10 and the second discharge unit 12, and is discharged by the charge/discharge unit 10 or the second discharge unit 12. Note that, according to the first embodiment, the output voltage of the power storage unit 92 when fully charged is higher than 0 V and is lower than the output voltage of the power source unit 90 when fully charged. Note that the output voltage of the power storage unit 92 when fully charged may be the same as the output voltage of the power source unit 90 when fully charged, or may be higher than the output voltage of the power source unit 90 when fully charged.

The load 94 is an example of a power supply target, and is configured as a known in-vehicle electrical component. The load 94 is electrically connected to the backup power source control apparatus 1 via a second wire 82. Suitable examples of the load 94 include electrical components for which power supply is demanded even when power supply from the power source unit 90 enters a failure state, such as an ECU and an actuator for a shift-by-wire system and an Advanced Driver-Assistance System (ADAS). In the above-described normal state, the load 94 operates based on power supplied from the power source unit 90, and, when power supply from the power source unit 90 is in a failure state, the load 94 operates based on power supplied from the power storage unit 92.

The backup power source control apparatus 1 mainly includes an input shut-off unit 14, an output shut-off unit 16, a control unit 20, and the like in addition to the charge/discharge unit 10 and the second discharge unit 12, which have been described above.

The input shut-off unit 14 is provided between the power source unit 90 and the load 94, switches between a permitted state where power supply from the power source unit 90 side to the load 94 side is permitted and a prohibited state where is power supply from the power source unit 90 side to the load 94 side is prohibited, and is configured as a known switching element such as an FET. The end of the input shut-off unit 14 on the power source unit 90 side is electrically connected to the first conductive path 71, and the input shut-off unit 14 is electrically connected to the power source unit 90 via this first conductive path 71. The end of the input shut-off unit 14 on the load 94 side is electrically connected to the third conductive path 73, and the input shut-off unit 14 is electrically connected to the load 94 via the third conductive path 73. The input shut-off unit 14 is controlled by a first control signal SG1 provided from the control unit 20, and switches to the permitted state due to receiving the first control signal SG1 serving as a permission signal, and switches to the prohibited state due to receiving the first control signal SG1 serving as a prohibition signal.

The output shut-off unit 16 is an example of a switch unit, is provided between the power source unit 90 and the load 94 at a position on the load 94 side relative to the input shut-off unit 14, switches between the permitted state where power supply from the power source unit 90 side to the load 94 side is permitted and the prohibited state where power supply from the power source unit 90 side to the load 94 side is prohibited, and is configured as a known switching element such as an FET. The end of the output shut-off unit 16 on the input shut-off unit 14 side (the power source unit 90 side) is electrically connected to the third conductive path 73, and the output shut-off unit 16 is electrically connected to the input shut-off unit 14 via the third conductive path 73. The end of the output shut-off unit 16 on the load 94 side is electrically connected to the second conductive path 72, and the output shut-off unit 16 is electrically connected to the load 94 via the second conductive path 72. The output shut-off unit 16 is controlled by a third control signal SG3 provided from the control unit 20, and switches to the permitted state due to receiving the third control signal SG3 serving as a permission signal, and switches to the prohibited state due to receiving the third control signal SG3 serving as a prohibition signal. Note that, with this configuration, the first conductive path 71, the second conductive path 72, and the third conductive path 73 constitute a power path 70.

The charge/discharge unit 10 is an example of a first discharge unit, and is a circuit that can perform a first discharge operation of supplying a discharge current that is based on power supply from the power storage unit 92, to the power path 70 via a first discharge path 61 and a first stop operation of stopping a discharge current that flows via the first discharge path 61. The first discharge path 61 is a conductive path that is provided between the charge/discharge unit 10 and the third conductive path 73. The charge/discharge unit 10 is configured as a known charging/discharging circuit, for example, and more specifically is configured as a known voltage conversion circuit such as a step-up/down DC-DC converter. The charge/discharge unit 10 is provided between the power source unit 90 and the power storage unit 92, and functions as a charge unit that charges the power storage unit 92 using power supplied from the power source unit 90. In addition, the charge/discharge unit 10 is provided between the power storage unit 92 and the load 94, and functions as a discharge unit that discharges the power storage unit 92 and supplies power to the load 94 side. The end of the charge/discharge unit 10 on the power storage unit 92 side is electrically connected to the fourth conductive path 74, and the charge/discharge unit 10 is electrically connected to the power storage unit 92 via the fourth conductive path 74. The end of the charge/discharge unit 10 on the load 94 side (the power source unit 90 side) is electrically connected to the third conductive path 73, and the charge/discharge unit 10 is electrically connected to the input shut-off unit 14 and the output shut-off unit 16 via the third conductive path 73. That is to say, the input shut-off unit 14 is provided between the power source unit 90 and the charge/discharge unit 10, and the output shut-off unit 16 is provided between the charge/discharge unit 10 and the load 94.

The charge/discharge unit 10 can perform a charge operation of charging the power storage unit 92 based on power from the power source unit 90, a charge stop operation of stopping charging of the power storage unit 92, a discharge operation of discharging the power storage unit 92 (first discharge operation), and a discharge stop operation of stopping discharging of the power storage unit 92 (first stop operation). The charge/discharge unit 10 is controlled by a second control signal SG2 provided from the control unit 20, performs the charge operation due to receiving the second control signal SG2 serving as a charge signal, performs the charge stop operation due to receiving the second control signal SG2 serving as a charge stop signal, performs the discharge operation due to receiving the second control signal SG2 serving as a discharge signal, and performs the discharge stop operation due to receiving the second control signal SG2 serving as a discharge stop signal.

If the second control signal SG2 serving as a charge signal is received, the charge/discharge unit 10 performs a voltage conversion operation of stepping up/down a power source voltage input from the power source unit 90 via the first conductive path 71, the input shut-off unit 14, and the third conductive path 73, and applies the stepped-up/down voltage to the power storage unit 92 via the fourth conductive path 74. If the second control signal SG2 serving as a charge stop signal is received, the charge/discharge unit 10 stops the above-described charge operation, and changes the third conductive path 73 and the fourth conductive path 74 to a non-conductive state.

If the second control signal SG2 serving as a discharge signal is received, the charge/discharge unit 10 performs a discharge operation of outputting a determined target voltage to the third conductive path 73 or the second conductive path 72 based on an input voltage applied to the fourth conductive path 74 (output voltage from the power storage unit 92). If the second control signal SG2 serving as a charge stop signal is received, the charge/discharge unit 10 stops the above-described discharge operation, and changes the third conductive path 73 and the fourth conductive path 74 to a non-conductive state.

The second discharge unit 12 is a discharge unit different from the charge/discharge unit 10 (the first discharge unit), and is a circuit that can perform a second discharge operation of supplying a discharge current that is based on power supply from the power storage unit 92, to the power supply target via a second discharge path 62 that is different from the first discharge path 61, and a second stop operation of stopping a discharge current that flows via the second discharge path 62. The second discharge unit 12 is configured as a known discharge circuit, for example, and more specifically is configured as a known switch (known semi-conductor switching element such as a FET). The second discharge unit 12 is provided between the power storage unit 92 and the load 94, and functions as a discharge unit that discharges the power storage unit 92 and supplies power to the load 94 side. The end of the second discharge unit 12 on the power storage unit 92 side is electrically connected to the fourth conductive path 74, and the second discharge unit 12 is electrically connected to the power storage unit 92 via the fourth conductive path 74. The end of the second discharge unit 12 on the load 94 side is electrically connected to the second conductive path 72, and the second discharge unit 12 is electrically connected to the load 94 via the second conductive path 72.

The second discharge unit 12 can perform a discharge operation (second discharge operation) of discharging the power storage unit 92, and a discharge stop operation (second stop operation) of stopping discharging of the power storage unit 92. In the discharge operation, the second discharge unit 12 is in a permitted state where power supply from the power storage unit 92 side to the load 94 side is permitted, and, in the discharge stop operation, the second discharge unit 12 is in a prohibited state where power supply from the power storage unit 92 side to the load 94 side is prohibited. The second discharge unit 12 is controlled by a fourth control signal SG4 provided from the control unit 20, and performs the discharge operation due to receiving the fourth control signal SG4 serving as a discharge signal, and performs the discharge stop operation due to receiving the fourth control signal SG4 serving as a discharge stop signal.

The control unit 20 is, for example, constituted by a known microcontroller and the like. The control unit 20 can switch the input shut-off unit 14 to one of a permitted state and a prohibited state by supplying the first control signal SG1 to the input shut-off unit 14. The control unit 20 can also switch the output shut-off unit 16 to one of a permitted state and a prohibited state by supplying the third control signal SG3 to the output shut-off unit 16.

The control unit 20 can cause the charge/discharge unit 10 to perform any one of the charge operation, the charge stop operation, the discharge operation, and the discharge stop operation by supplying the second control signal SG2 to the charge/discharge unit 10. In addition, the control unit 20 can detect that power supply from the power source unit 90 has entered a failure state, and can perform first discharge control for controlling the charge/discharge unit 10 to discharge the power storage unit 92 based on the detection of the failure state. Note that the control unit 20 monitors the voltage of the first conductive path 71, and, when the voltage of the first conductive path 71 falls below the predetermined first threshold voltage Vth1, determines that a failure state has occurred. That is to say, with this configuration, a case where the voltage of the first conductive path 71 falls below the predetermined first threshold voltage Vth1 is an example of "a case where power supply that is based on the power source unit 90 enters a failure state". The first threshold voltage Vth1 is a value that is larger than 0 V and is smaller than the output voltage of the power source unit 90.

The control unit 20 can cause the second discharge unit 12 to perform any one of the discharge operation and the discharge stop operation by supplying the fourth control signal SG4 to the second discharge unit 12. The control unit 20 can also determine whether or not there is an abnormality where the power storage unit 92 is not discharged by the charge/discharge unit 10 when the above failure state is detected. If it is determined that there is the above abnormality, the control unit 20 can perform second discharge control for controlling the second discharge unit 12 to discharge the power storage unit 92.

The control unit 20 includes a first control unit 22 and a second control unit 24 that operate independently. The first control unit 22 includes a voltage detection unit that detects a voltage applied to the first conductive path 71 (voltage of the first conductive path 71) based on the output voltage of the power source unit 90, and a voltage detection unit that detects a charging voltage of the power storage unit 92 (voltage of the fourth conductive path 74), and the first control unit 22 can obtain the voltage applied to the first conductive path 71 (voltage of the first conductive path 71) based on the output voltage of the power source unit 90 and can obtain the charging voltage of the power storage unit 92 (voltage of the fourth conductive path 74). The charge/discharge unit 10 and the input shut-off unit 14 are to be controlled by the first control unit 22, which can perform the above-described first discharge control. The first control unit 22 is configured to be capable of operating even when the second control unit 24 stops operating due to a malfunction or the like.

The second control unit 24 includes a voltage detection unit that detects a voltage applied to the first conductive path 71 (voltage of the first conductive path 71) based on the output voltage of the power source unit 90, and a voltage detection unit that detects a voltage of the third conductive path 73, and can obtain the voltage applied to the first conductive path 71 (voltage of the first conductive path 71) based on the output voltage of the power source unit 90, and can obtain the voltage of the third conductive path 73. The second discharge unit 12 and the output shut-off unit 16 are to be controlled by the second control unit 24, which can perform the above-described second discharge control. The second control unit 24 is configured to be capable of operating even when the first control unit 22 stops operating due to a malfunction or the like.

Each of the first control unit 22 and the second control unit 24 may be configured as a microcontroller, may be an FPGA (field programmable gate array) or the like, or may be constituted by another hardware circuit. The first control unit 22 and the second control unit 24 may also be configured as separate one-chip microcomputers, for example. Note that, in this embodiment, an example is described in which the first control unit 22 is configured as a microcontroller and the second control unit 24 is constituted by a hardware circuit.

Next, operations of the backup power source control apparatus 1 will be described.

When power supply from the power source unit 90 is in a normal state, both the input shut-off unit 14 and the output shut-off unit 16 are set to the permitted state, and power is supplied to the load 94 via the first conductive path 71, the third conductive path 73, and the second conductive path 72. In addition, the second discharge unit 12 is set to the prohibited state.

At this time, the first control unit 22 (the control unit 20) monitors the charging voltage of the power storage unit 92 (voltage of the fourth conductive path 74), and, when the charging voltage of the power storage unit 92 is lower than or equal to a predetermined value at which charging is required, the first control unit 22 outputs the second control signal SG2 serving as a charge signal to the charge/discharge unit 10. Accordingly, the charge/discharge unit 10 is controlled to perform the charge operation. When the charging voltage of the power storage unit 92 reaches the predetermined target voltage, the charge/discharge unit 10 is controlled to perform the charge stop operation by outputting the second control signal SG2 serving as a charge stop signal, to the charge/discharge unit 10.

Furthermore, the first control unit 22 (the control unit 20) repeatedly determines whether or not power supply from the power source unit 90 has entered a failure state. More specifically, the voltage of the first conductive path 71 is monitored, and it is repeatedly determined whether or not the voltage of the first conductive path 71 has fallen to the first threshold voltage Vth1 or lower, and, when the voltage of the first conductive path 71 falls to the first threshold voltage Vth1 or lower, it is detected that power supply from the power source unit 90 has entered a failure state.

When the failure state is detected, the first control unit 22 (the control unit 20) outputs the first control signal SG1 serving as a prohibition signal to the input shut-off unit 14, and outputs the second control signal SG2 serving as a discharge signal to the charge/discharge unit 10. That is to say, the first control unit 22 (the control unit 20) controls the input shut-off unit 14 to enter the prohibited state, and controls the charge/discharge unit 10 to discharge the power storage unit 92. Accordingly, power is supplied from the power storage unit 92 to the load 94, and the charge/discharge unit 10 performs backup.

However, there may be a case where, when power supply from the power source unit 90 enters a failure state, backup is not performed in a normal manner by the charge/discharge unit 10. As a reason for that, cases are conceivable in which the charge/discharge unit 10 does not operate in a normal manner due to a malfunction or the like, where the input shut-off unit 14 is maintained in the permitted state due to a malfunction or the like and a voltage cannot be applied to the third conductive path 73, and where the first control unit 22 cannot cause the charge/discharge unit 10 and the input shut-off unit 14 to operate in a normal manner due to a malfunction or the like, for example. In anticipation of such situations, the following measures are taken in this backup power source control apparatus 1.

Figure 2:
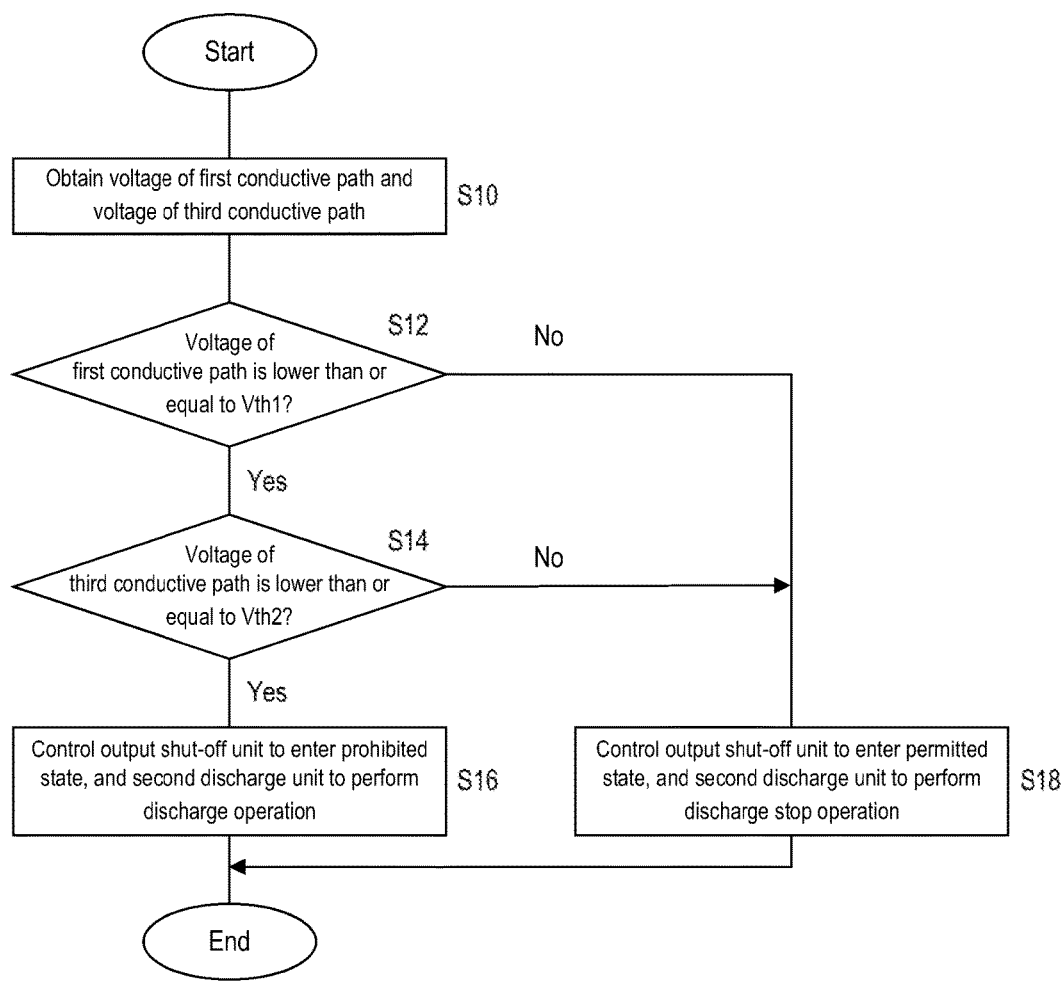
FIG. 2 is a flowchart showing a flow of second discharge control according to the first embodiment.

After a start switch (for example, an ignition switch) is switched to an on-state, the second control unit 24 (the control unit 20) repeatedly executes the second discharge control shown in FIG. 2 until the start switch (for example, an ignition switch) is switched to an off-state.

In step S10, the second control unit 24 obtains the voltage of the first conductive path 71 and the voltage of the third conductive path 73. A determination is then made on whether or not power supply from the power source unit 90 has entered a failure state. Specifically, in step S12, a determination is made on whether or not the voltage of the first conductive path 71 is lower than or equal to the first threshold voltage Vth1. If the voltage of the first conductive path 71 is not lower than or equal to the first threshold voltage Vth1 (step S12: NO), it is determined that power is being supplied from the power source unit 90 in a normal manner. Subsequently, in step S18, the third control signal SG3 serving as a permission signal is output to the output shut-off unit 16, and the fourth control signal SG4 serving as a prohibition signal is output to the second discharge unit 12. That is to say, the second control unit 24 (the control unit 20) performs control so as to maintain the permitted state of the output shut-off unit 16, and performs control so as to maintain the prohibited state of the second discharge unit 12.

Thereafter, when a failure state occurs, the voltage of the first conductive path 71 falls to the first threshold voltage Vth1 or lower, and thus, in step S12, it is determined that the voltage of the first conductive path 71 is lower than or equal to the first threshold voltage Vth1 (step S12: YES), and it is determined that a failure state has occurred. If it is determined that a failure state has occurred (voltage of the first conductive path 71 is lower than or equal to the first threshold voltage Vth1), the second control unit 24 (the control unit 20) determines whether or not there is an abnormality where the power storage unit 92 is not discharged by the charge/discharge unit 10. Specifically, the second control unit 24 determines in step S14 whether or not the voltage of the third conductive path 73 is lower than or equal to a second threshold voltage Vth2. In this embodiment, the second threshold voltage Vth2 is the same as the first threshold voltage Vth1.

If it is determined in step S14 that the voltage of the third conductive path 73 is not lower than or equal to the second threshold voltage Vth2 (step S14: NO), it is determined that backup is being performed in a normal manner by the charge/discharge unit 10. In step S18, the third control signal SG3 serving as a permission signal is then output to the output shut-off unit 16, and the fourth control signal SG4 serving as a discharge stop signal is output to the second discharge unit 12. That is to say, the second control unit 24 (the control unit 20) performs control so as to maintain the permitted state of the output shut-off unit 16, and performs control so as to maintain the prohibited state of the second discharge unit 12.

In contrast, if it is determined in step S14 that the voltage of the third conductive path 73 is lower than or equal to the second threshold voltage Vth2 (step S14: YES), the second control unit 24 (the control unit 20) determines that backup is not being performed in a normal manner by the charge/discharge unit 10. That is to say, it is determined that there is an abnormality where the power storage unit 92 cannot be discharged by the charge/discharge unit 10. Subsequently, in step S16, the third control signal SG3 serving as a prohibition signal is output to the output shut-off unit 16, and the fourth control signal SG4 serving as a discharge signal is output to the second discharge unit 12. That is to say, the second control unit 24 (the control unit 20) controls the output shut-off unit 16 to enter the prohibited state, and controls the second discharge unit 12 to discharge the power storage unit 92. Accordingly, power is supplied from the power storage unit 92 to the load 94, and the second discharge unit 12 performs backup.

Next, a backup operation performed by the backup power source control apparatus 1 will be described with reference to the timing charts in FIGS. 3 and 4.

Figure 3:
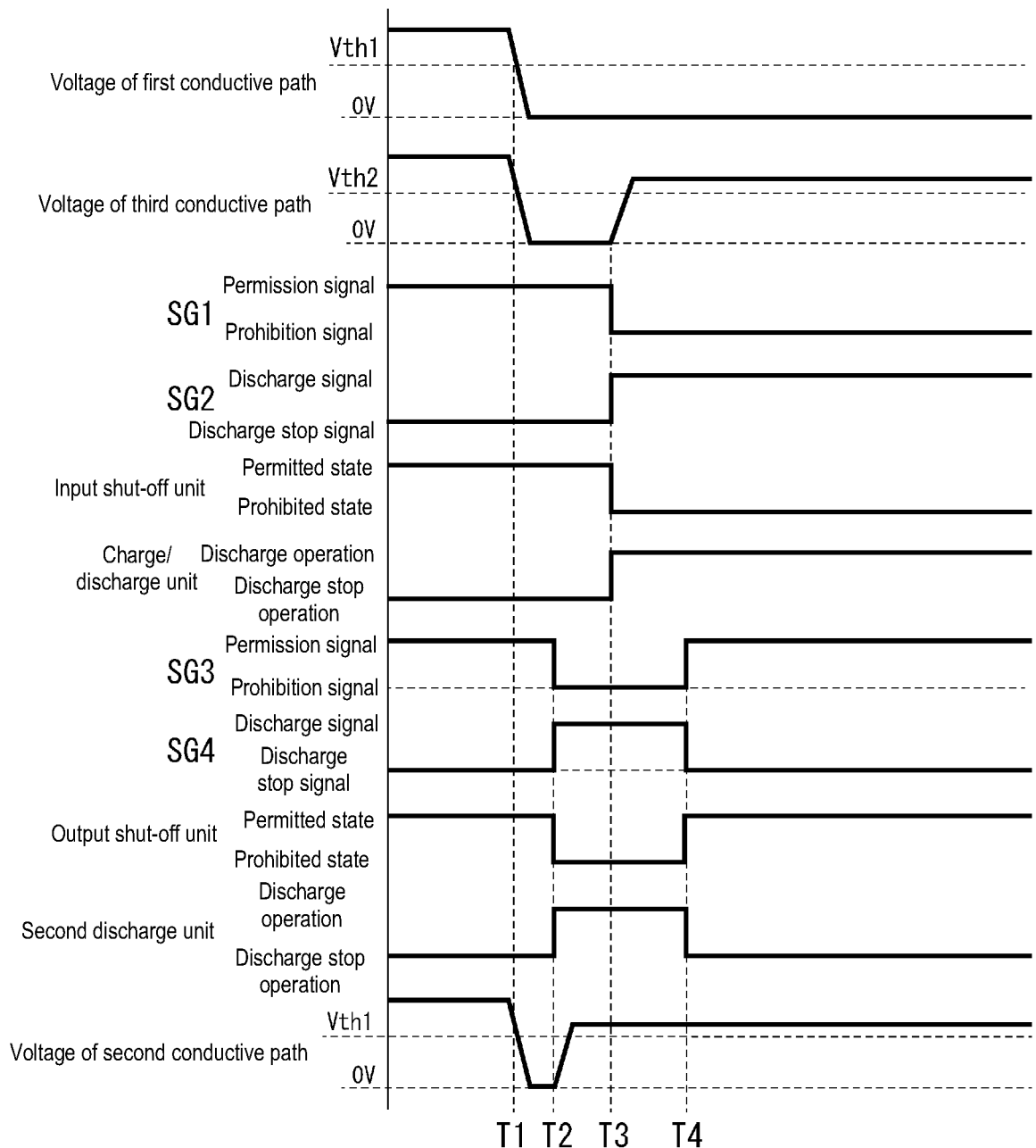
FIG. 3 is a timing chart showing a flow when backup is performed in a normal manner by a charge/discharge unit according to the first embodiment.

FIG. 3 illustrates operations when backup is performed in a normal manner by the charge/discharge unit 10.

When power supply from the power source unit 90 is in a normal state, the voltage of the first conductive path 71 is maintained at a voltage that is higher than the first threshold voltage Vth1. Therefore, the first control unit 22 sets the input shut-off unit 14 to the permitted state by outputting the first control signal SG1 serving as a permission signal. Furthermore, the first control unit 22 monitors the charging voltage of the power storage unit 92 (output voltage of the fourth conductive path 74), and if the charging voltage of the power storage unit 92 is lower than or equal to a value required for charging, the first control unit 22 causes the charge/discharge unit 10 to charge the power storage unit 92 by outputting the second control signal SG2 serving as a charge signal, and, when the charging voltage of the power storage unit 92 reaches a target voltage, the first control unit 22 causes the charge/discharge unit 10 to stop the charge operation by outputting the second control signal SG2 serving as a charge stop signal.

In addition, when power supply from the power source unit 90 is in a normal state, the voltage of the first conductive path 71 is maintained at a voltage that is higher than the first threshold voltage Vth1, and the voltage of the third conductive path 73 is maintained at a voltage that is higher than the second threshold voltage Vth2. Therefore, the second control unit 24 outputs the third control signal SG3 serving as a permission signal and the fourth control signal SG4 serving as a discharge stop signal. Therefore, the output shut-off unit 16 is changed to the permitted state, and the second discharge unit 12 performs the discharge stop operation.

The output voltage of the backup power source control apparatus 1 (voltage of the second conductive path 72) is then maintained at a voltage that is higher than both the first threshold voltage Vth1 and the second threshold voltage Vth2.

Thereafter, when a failure state occurs, the first control unit 22 and the second control unit 24 detect at timing T1 that a failure state has occurred. The second control unit 24 that has detected the failure state further determines that the voltage of the third conductive path 73 is lower than or equal to the second threshold voltage Vth2. That is to say, it is determined that there is an abnormality where the power storage unit 92 is not discharged by the charge/discharge unit 10. With this configuration, a case where, in a failure state, the voltage of the third conductive path 73 is lower than or equal to the second threshold voltage Vth2 is an example of "a case where the first discharge operation performed by the first discharge unit is in an abnormal state". At timing T2, the second control unit 24 immediately outputs the third control signal SG3 serving as a prohibition signal and the fourth control signal SG4 serving as a discharge signal without waiting for a time required from when the failure state occurred until when discharging is started by the charge/discharge unit 10. Accordingly, the second control unit 24 controls the output shut-off unit 16 to enter the prohibited state, and controls the second discharge unit 12 to discharge the power storage unit 92.

On the other hand, at timing T3, the first control unit 22 outputs the first control signal SG1 serving as a prohibition signal and the second control signal SG2 serving as a discharge signal, based on the failure state having been detected. Accordingly, the first control unit 22 controls the input shut-off unit 14 to enter the prohibited state, and controls the charge/discharge unit 10 to perform discharging. As a result, the power storage unit 92 is discharged by the charge/discharge unit 10, and thus the voltage of the third conductive path 73 rises to the second threshold voltage Vth2 or higher.

Thereafter, the second control unit 24 determines that there is no abnormality described above in accordance with the voltage of the third conductive path 73 having risen to the second threshold voltage Vth2 or higher, and, at timing T4, outputs the third control signal SG3 serving as a permission signal and the fourth control signal SG4 serving as a discharge stop signal. Accordingly, the second control unit 24 controls the output shut-off unit 16 to enter the permitted state, and causes the second discharge unit 12 to stop performing discharging.

Figure 4:
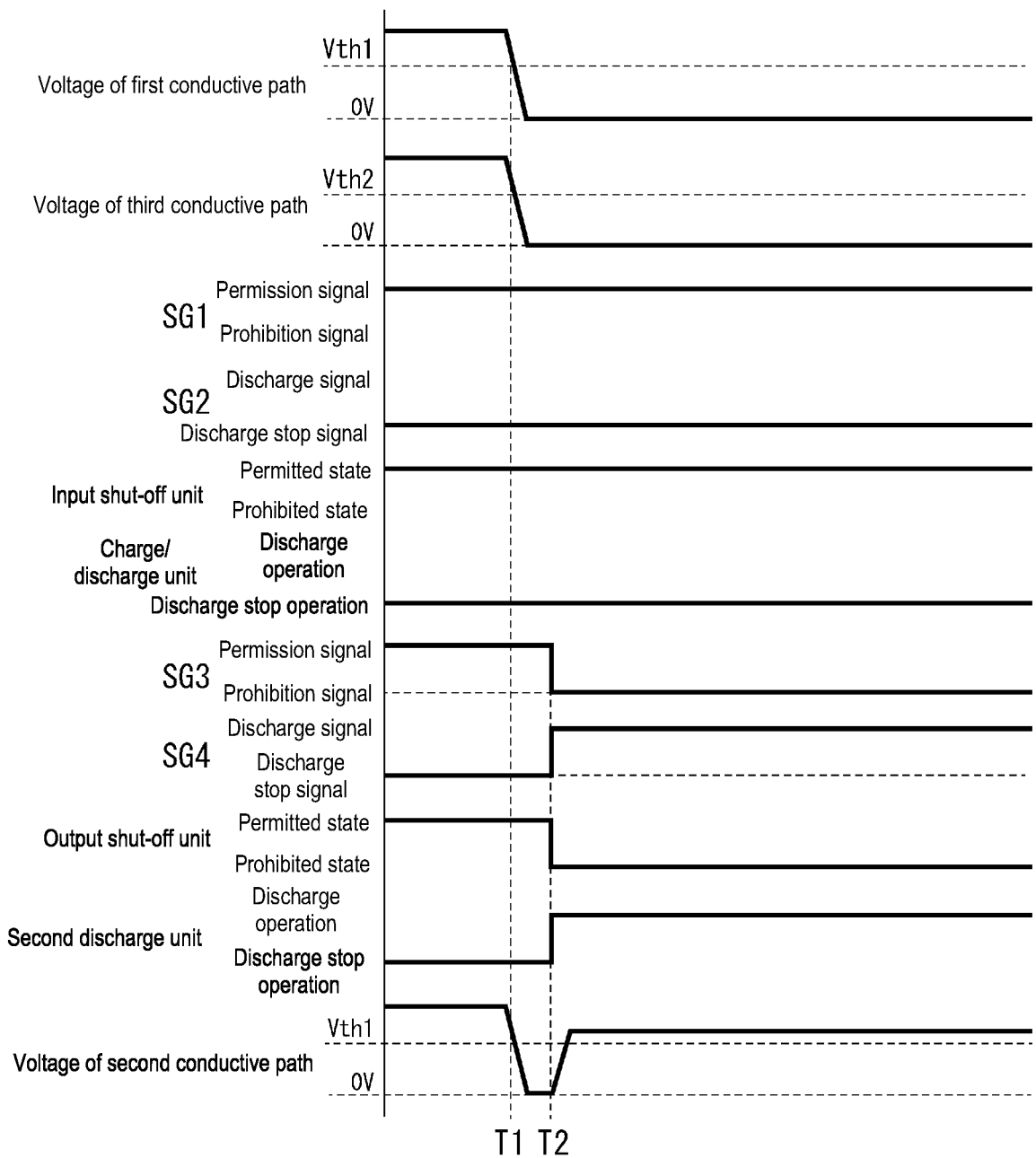
FIG. 4 is a timing chart showing a flow when backup is not performed in a normal manner by the charge/discharge unit according to the first embodiment.

In contrast, when backup is not performed in a normal manner, the following operations illustrated in FIG. 4 are performed. Note that, in the example shown in FIG. 4, a case is envisioned in which a malfunction or the like occurs in the first control unit 22, and no control signal can be output to the input shut-off unit 14 and the charge/discharge unit 10.

Operations when power supply from the power source unit 90 is in a normal state are similar to the operations when backup is performed in a normal manner, and thus a description thereof is omitted.

When a failure state occurs, the second control unit 24 detects at timing T1 that a failure state has occurred. The second control unit 24 that has detected the failure state further determines that the voltage of the third conductive path 73 is lower than or equal to the second threshold voltage Vth2. That is to say, it is determined that there is an abnormality where the power storage unit 92 is not discharged by the charge/discharge unit 10. When it is determined that there is the above-described abnormality, the second control unit 24 immediately outputs, at timing T2, the third control signal SG3 serving as a prohibition signal and the fourth control signal SG4 serving as a discharge signal without waiting for a time required from when the failure state occurred until the first control unit 22 causes the charge/discharge unit 10 to discharge the power storage unit 92. Accordingly, the second control unit 24 controls the output shut-off unit 16 to enter the prohibited state, and controls the second discharge unit 12 to discharge the power storage unit 92.

On the other hand, the first control unit 22 cannot detect the failure state due to a malfunction or the like having occurred. Alternatively, the first control unit 22 can detect the failure state, but cannot output an appropriate control signal. As a result, the input shut-off unit 14 is maintained in the permitted state, and a state where the charge/discharge unit 10 does not perform discharging is maintained. Therefore, a state where the voltage of the third conductive path 73 is lower than or equal to the second threshold voltage Vth2 is maintained. Thus, the second control unit 24 causes the second discharge unit 12 to continue discharging the power storage unit 92. That is to say, when backup is not performed in a normal manner by the charge/discharge unit 10, the second discharge unit 12 performs backup.

Next, the effects of the backup power source control apparatus 1 that has this configuration will be described.

When power supply that is based on the power source unit 90 enters a failure state, the backup power source control apparatus 1 that has this configuration causes the charge/discharge unit 10 (first discharge unit) to perform the first discharge operation. If this first discharge operation is performed, power that is based on the power storage unit 92 can be supplied to the power path 70, and it is possible to continue power supply to the load 94 (power supply target). Furthermore, with this configuration, even when the first discharge operation performed by the charge/discharge unit 10 (first discharge unit) enters an abnormal state, it is possible to cause the second discharge unit 12 to perform the second discharge operation, and supply power to the load 94 using a path different from the path for the charge/discharge unit 10 (first discharge unit). Thus, the reliability of a backup operation increases significantly. Moreover, also when a backup operation is performed by the second discharge unit 12, the same power storage unit 92 that is used when a backup operation is performed by the charge/discharge unit 10 (first discharge unit) can be used as a power supply source, and thus the above-described effects can be achieved while suppressing an increase in the number of components. In this manner, according to the backup power source control apparatus 1 that has this configuration, it is possible to realize a configuration that can increase the reliability of a backup operation, in a simpler manner.

With this configuration, the first control unit 22 and the second control unit 24 are configured to operate independently from each other, and thus, even when the first discharge operation is not performed in a normal manner due to an abnormality caused by the first control unit 22 (for example, a malfunction of the first control unit 22), the second control unit 24 can independently control the second discharge unit 12 to perform the second discharge operation.

With this configuration, the input shut-off unit 14 that switches between an on-state and an off-state is provided on the power path 70, on the power source unit 90 side relative to a connection portion 73A of the first discharge path 61. Also, the output shut-off unit 16 (switch unit) that switches between an on-state and an off-state is provided on the power path 70 on the load 94 (power supply target) side relative to the connection portion 73A. On the power path 70, the first conductive path 71 is provided on the power source unit 90 side relative to the input shut-off unit 14, the second conductive path 72 is provided on the load 94 (power supply target) side relative to the output shut-off unit 16 (switch unit), and the third conductive path 73 is provided between the input shut-off unit 14 and the output shut-off unit 16 (switch unit). A configuration is adopted in which, in the on-state, the input shut-off unit 14 permits power supply from the first conductive path 71 side to the third conductive path 73 side, and, in the off-state, shuts off power supply from the first conductive path 71 side to the third conductive path 73 side. A configuration is adopted in which, in the on-state, the output shut-off unit 16 (switch unit) permits power supply from the third conductive path 73 side to the second conductive path 72 side, and, in the off-state, shuts off power supply from the third conductive path 73 side to the second conductive path 72 side. The second discharge unit 12 is electrically connected to the second conductive path 72, and, when power supply that is based on the power source unit 90 enters a failure state and at least the first discharge operation that is performed by the charge/discharge unit 10 (first discharge unit) is in an abnormal state, the second control unit 24 operates so as to switch the output shut-off unit 16 (switch unit) to the off-state. According to this configuration, when the first discharge operation enters an abnormal state, it is possible to switch the output shut-off unit 16 (switch unit) to the off-state and electrically disconnect the third conductive path 73 and the second conductive path 72. Therefore, when a discharge current is supplied to the second conductive path 72 through the second discharge operation, it is possible to supply a discharge current in a stable manner without being affected by the state on the third conductive path 73 side.

The second control unit 24 may operate so as to, when power supply that is based on the power source unit 90 enters a failure state, cause the second discharge unit 12 to start the second discharge operation before the charge/discharge unit 10 (first discharge unit) starts the first discharge operation in accordance with control by the first control unit 22. According to this configuration, after a failure state has occurred, it is possible to cause the second discharge unit 12 to start a backup operation before the charge/discharge unit 10 (first discharge unit) starts the first discharge operation. Thus, compared with a configuration in which a backup operation is performed only by the charge/discharge unit 10 (first discharge unit), a time lag from when a failure state occurred until when a backup operation is started can be shortened.

The charge/discharge unit 10 (first discharge unit) may also be a voltage conversion unit that steps up or steps down an input voltage that depends on the charging voltage of the power storage unit 92, and applies a predetermined output voltage to the first discharge path 61. The second discharge unit 12 may be a switch that permits conduction from the power storage unit 92 side to the load 94 (power supply target) side in the on-state, and shuts off conduction from the power storage unit 92 side to the load 94 (power supply target) side in the off-state. The second control unit 24 may operate so as to cause the second discharge unit 12 to start the second discharge operation when power supply that is based on the power source unit 90 enters a failure state, and to stop the second discharge operation when the charge/discharge unit 10 (first discharge unit) starts the first discharge operation during the second discharge operation. According to this configuration, when a failure state occurs, a backup operation can be performed such that the charge/discharge unit 10 (first discharge unit) outputs a predetermined output voltage. Moreover, if the second discharge unit 12 starts the second discharge operation before the charge/discharge unit 10 (first discharge unit) starts the first discharge operation, a time lag from when the failure state occurred until when a backup operation is started can be shortened, and, if the first discharge operation is started after the second discharge operation has been started, and the second discharge operation is then stopped, the subsequent backup operation can be integrated with the first discharge operation.

Second Embodiment

A backup power source control apparatus 201 according to a second embodiment adopts a configuration in which a capacitor 30 is added to the backup power source control apparatus 1 according to the first embodiment, and the other configurations are the same. In addition, a backup power source apparatus 202 according to the second embodiment is constituted by the backup power source control apparatus 201 and a power storage unit 92, and an in-vehicle power source system 200 according to the second embodiment is constituted by the backup power source apparatus 202 and a power source unit 90. Note that the same reference numerals are assigned to the same configurations as the first embodiment, and a description thereof is omitted.

Figure 5:
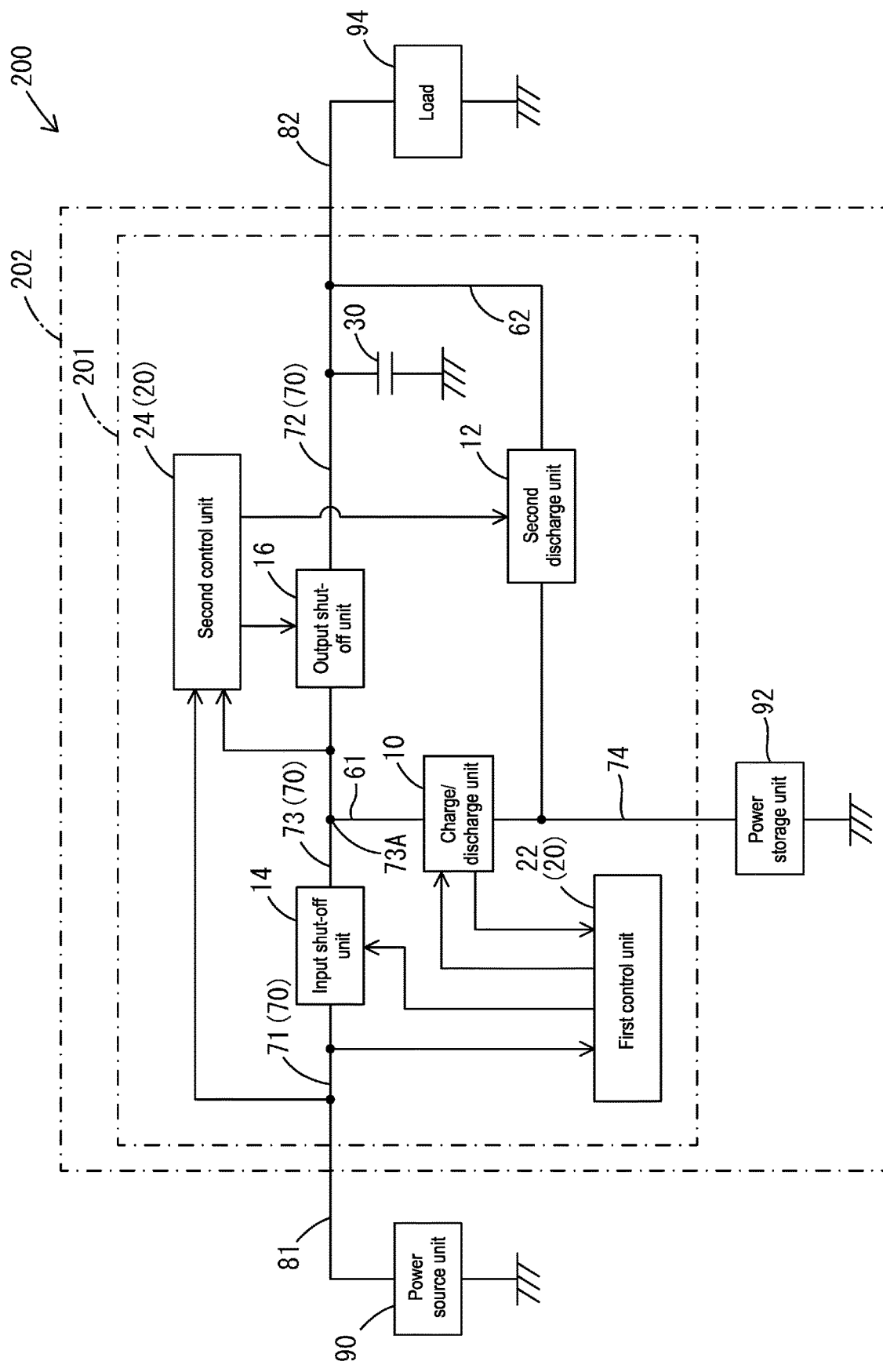
FIG. 5 is a circuit diagram schematically showing an in-vehicle power source system that includes a backup power source control apparatus according to a second embodiment.

As shown in FIG. 5, the capacitor 30 is electrically connected to the power path 70 (the second conductive path 72) that is provided between the power source unit 90 and the load 94. When power supply from the power source unit 90 is in a normal state, the capacitor 30 is charged using a current supplied from the power source unit 90 via the power path 70. On the other hand, when the above failure state occurs, the capacitor 30 discharges, and supplies a discharge current to the power path 70.

Figure 6:
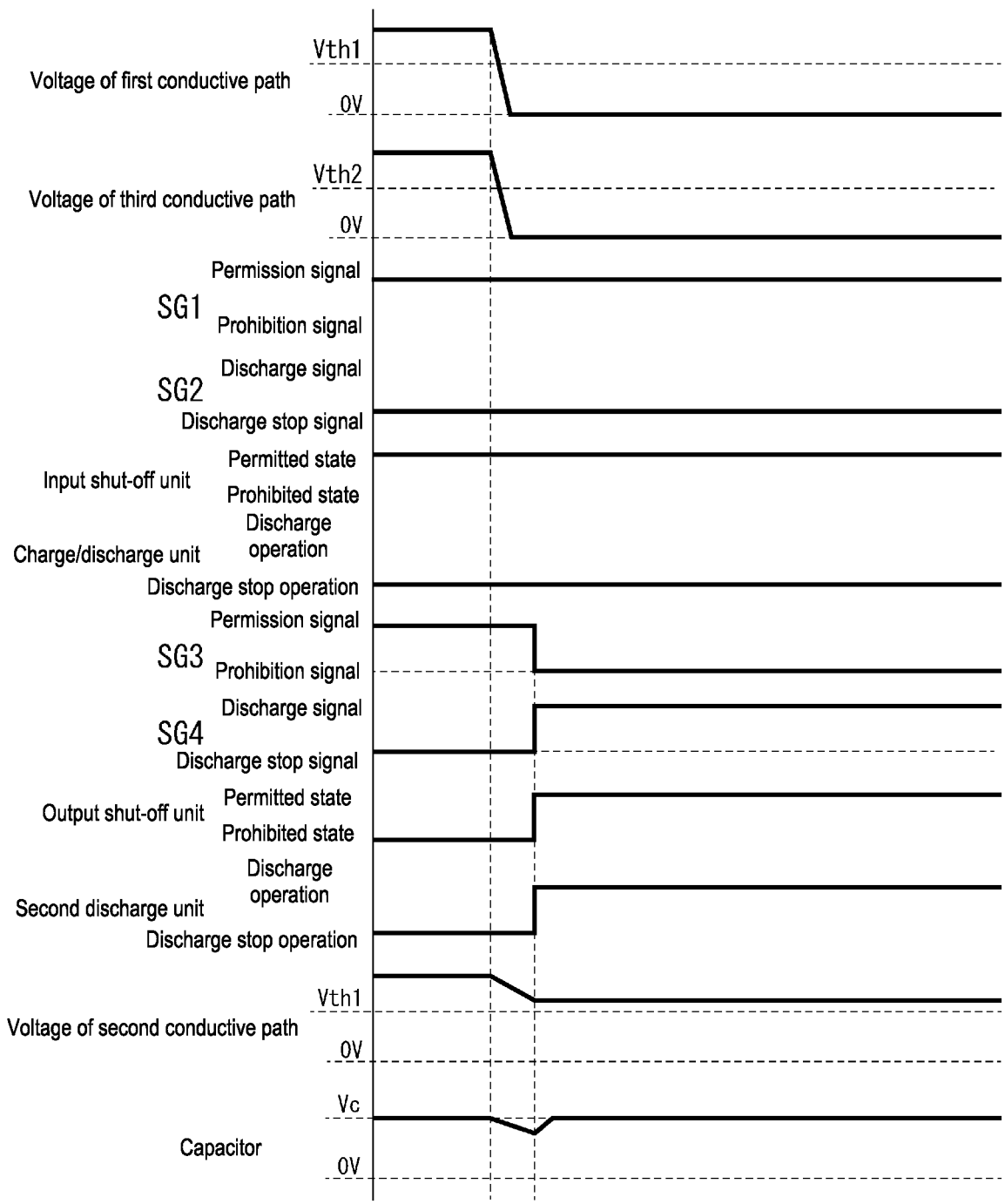
FIG. 6 is a timing chart showing a flow when backup is not performed in a normal manner by a charge/discharge unit according to the second embodiment.

Operations of this backup power source control apparatus 201 will be described. FIG. 6 illustrates a timing chart of operations in a case where discharging is not performed by the charge/discharge unit 10 when a failure state occurs.

The capacitor 30 is fully charged before a failure state occurs. Operations of the constituent elements other than the capacitor 30 when power supply from the power source unit 90 is in a normal state are similar to those of the first embodiment, and thus a description thereof is omitted.

When a failure state occurs, power is not supplied from the power source unit 90 and the voltage of the power supply path (the second conductive path 72) falls, and thus the capacitor 30 discharges. Therefore, a fall of the voltage of the second conductive path 72 (output voltage of the backup power source control apparatus 201) electrically connected to the capacitor 30 is suppressed. In addition, while power is supplied from the capacitor 30 to the load 94, the second control unit 24 detects that the above failure state has occurred, determines that there is an abnormality where the power storage unit 92 is not discharged by the charge/discharge unit 10, and outputs the third control signal SG3 serving as a prohibition signal and the fourth control signal SG4 serving as a discharge signal. That is to say, the second control unit 24 controls the output shut-off unit 16 to enter the prohibited state, and controls the second discharge unit 12 to discharge the power storage unit 92.

Next, effects of the backup power source control apparatus 201 according to the second embodiment will be described.

With this configuration, the capacitor 30 that is electrically connected to the second conductive path 72, and is charged based on power supplied from the power source unit 90 is provided. According to this configuration, when a malfunction such as an open circuit or the like occurs on the power source unit 90 side and power supply from the power source unit 90 ceases, power can be immediately supplied from the capacitor 30 to the load 94 (power supply target). Therefore, there is an increase in the likelihood of power supply to the load 94 (power supply target) being maintained during a period from when power supply that is based on the power source unit 90 ceases until when a backup operation is started by the charge/discharge unit 10 (first discharge unit) or the second discharge unit 12. Note that, regarding the above-described configuration, an example is illustrated in which the capacitor 30 is connected to the second conductive path 72, but the capacitor 30 may be connected to the third conductive path 73.

Third Embodiment

A backup power source control apparatus 301 according to a third embodiment adopts a configuration in which a low-dropout regulator 32 (hereinafter, also referred to as "an LDO 32") is added to the backup power source control apparatus 1 according to the first embodiment, and the other configurations are the same. In addition, a backup power source apparatus 302 according to the third embodiment is constituted by the backup power source control apparatus 301 and a power storage unit 92, and an in-vehicle power source system 300 according to the third embodiment is constituted by the backup power source apparatus 302 and a power source unit 90. Note that the same reference numerals are assigned to the same configurations as the first embodiment, and a description thereof is omitted.

Figure 7:
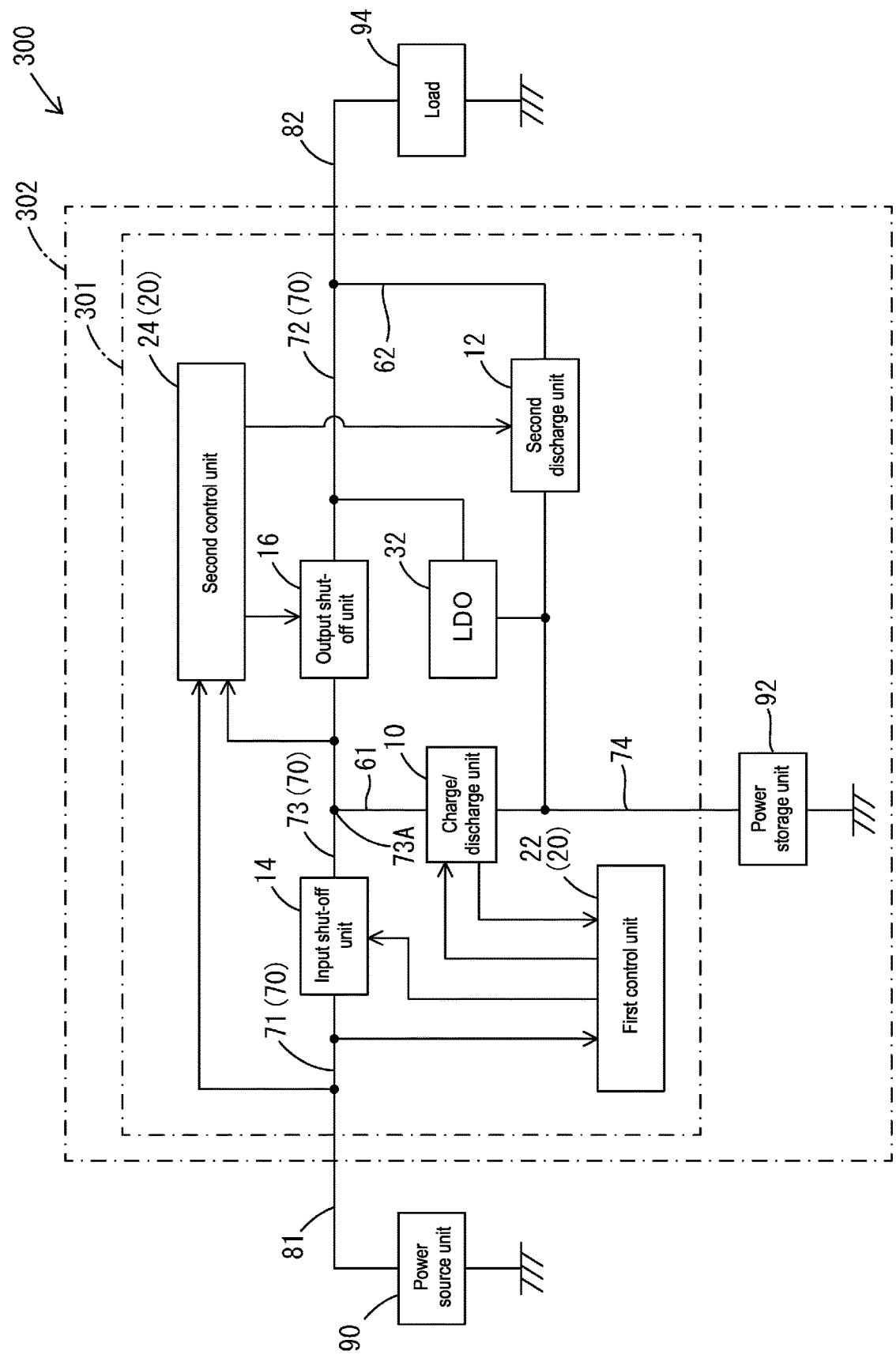
FIG. 7 is a circuit diagram schematically showing an in-vehicle power source system that includes a backup power source control apparatus according to a third embodiment.

The LDO 32 outputs a voltage obtained by dropping an input voltage to a predetermined voltage. As shown in FIG. 7, the LDO 32 is provided between the power storage unit 92 and the load 94. The end of the LDO 32 on the power storage unit 92 side is electrically connected to the fourth conductive path 74, and the LDO 32 is electrically connected to the power storage unit 92 via the fourth conductive path 74. The end of the LDO 32 on the load 94 side is electrically connected to the second conductive path 72 (the power path 70), and the LDO 32 is electrically connected to the load 94 via the second conductive path 72 (the power path 70). The LDO 32 drops a voltage applied to the fourth conductive path 74, to a voltage that is lower than the voltage of the second conductive path 72 when power supply from the power source unit 90 is in a normal state, and applies the voltage to the second conductive path 72. Here, the lowered voltage of the LDO 32 is set to a voltage that is higher than 0 V, and is lower than or equal to the first threshold voltage Vth1.

Operations of the backup power source control apparatus 301 provided with this LDO 32 will be described. Here, an example where discharging is not performed by the charge/discharge unit 10 when a failure state occurs will be described.

When power supply from the power source unit 90 is in a normal state, the voltage lowered by the LDO 32 is lower than the voltage applied to the second conductive path 72 based on the output voltage of the power source unit 90. Therefore, the voltage lowered by the LDO 32 is not applied to the second conductive path 72.

Thereafter, when a failure state occurs, resulting in a stop of power supply from the power source unit 90 and a fall of the voltage of the second conductive path 72 below the voltage lowered by the LDO 32, the voltage lowered by the LDO 32 is output to the second conductive path 72. Accordingly, power is supplied from the LDO 32 to the load 94. Thereafter, when the second discharge unit 12 is discharged, the voltage of the second conductive path 72 exceeds the lowered voltage of the LDO 32, and output of the LDO 32 stops.

Next, effects of the backup power source control apparatus 301 according to the third embodiment will be described.

One end of the backup power source control apparatus 301 according to the third embodiment is electrically connected to the power storage unit 92, and another end is electrically connected to the second conductive path 72, and the backup power source control apparatus 301 includes the LDO 32 (low-dropout regulator) that drops the input voltage that depends on the charging voltage of the power storage unit 92 and applies the output voltage to the second conductive path 72 when power supply that is based on the power source unit 90 enters a failure state. According to this configuration, when a malfunction such as an open circuit or the like occurs on the power source unit 90 side and power supply ceases, power can be immediately supplied to the load 94 (power supply target) by the LDO 32 (low-dropout regulator). Therefore, there is an increase in the likelihood of power supply to the load 94 (power supply target) being maintained during a period from when power supply that is based on the power source unit 90 ceases until when a backup operation is started by the charge/discharge unit 10 (first discharge unit) or the second discharge unit 12. Note that, during the period in which the voltage of the second conductive path 72 exceeds a predetermined voltage (voltage corresponding to the difference in potential at which a step-down operation is started by the low-dropout regulator), a step-down operation is not performed by the LDO 32 (low-dropout regulator), and thus, during this period, discharge of the power storage unit 92 performed by the LDO 32 (low-dropout regulator) is suppressed. Note that, with the above configuration, an example is illustrated in which the other end of the LDO 32 is connected to the second conductive path 72, but the other end of the LDO 32 may be connected to the third conductive path 73.

Other Embodiments

The present disclosure is not limited to the embodiments described above with reference to the drawings, and for example, the following embodiments are also included in the technical scope of the present disclosure.

In the above embodiments, a lead battery is used as the power source unit 90, but there is no limitation to this configuration, and, in any of the examples in the present specification, in place of or in addition to a lead battery, other power source means (a power source such as a lithium-ion battery, an alternator, or a converter) may be used as the power source unit 90. The number of power source means that constitute the power source unit 90 is not limited to one, and the power source unit 90 may be constituted by a plurality of power source means.

In the above embodiments, an electric double layer capacitor (EDLC) is used as the power storage unit 92, but there is no limitation to this configuration, and, in any of the examples in the present specification, other power storage means such as a lithium-ion capacitor, a capacitor, a lead battery, or a lithium-ion battery may be used as the power storage unit 92. In addition, the number of power storage means that constitute the power storage unit 92 is not limited to one, and the power storage unit 92 may be constituted by a plurality of power storage means.

In the above embodiments, an FET is illustrated as an example of the input shut-off unit 14, but the input shut-off unit 14 may also be another semiconductor switch or an electrical component such as a relay.

In the above embodiments, the input shut-off unit 14 is switched between the permitted state and the prohibited state in accordance with an instruction from the control unit 20, but the input shut-off unit 14 may itself determine whether to switch to the permitted state or the prohibited state. For example, a configuration may also be adopted in which the input shut-off unit 14 monitors the voltage of the first conductive path 71, determines by itself whether or not a failure state has occurred, and switches between the permitted state and the prohibited state based on the determination result.

In the above embodiments, an FET is illustrated as an example of the output shut-off unit 16, but the output shut-off unit 16 may also be another semiconductor switch or an electrical component such as a relay.

In the above embodiments, the output shut-off unit 16 is switched between the permitted state and the prohibited state in accordance with an instruction from the control unit 20, but the output shut-off unit 16 may itself determine whether to switch to the permitted state or the prohibited state. For example, a configuration may also be adopted in which, when a failure state is detected as a result of monitoring the voltage of the first conductive path 71 and the voltage of the third conductive path 73, the output shut-off unit 16 determines whether or not there is an abnormality where the power storage unit 92 is not discharged by the charge/discharge unit 10, and switches between the permitted state and the prohibited state based on the determination result.

In the above embodiments, the charge/discharge unit 10 is illustrated as an example of the first discharge unit, but it suffices for a configuration to be adopted in which the power storage unit 92 can be discharged, and a charging circuit and a discharge circuit may also be separately configured. In addition, the first discharge unit is not limited to a voltage conversion circuit, and, for example, may be constituted by a switch.

In the above embodiments, an example is illustrated in which the second discharge unit 12 is constituted by a switch, but it suffices for a configuration to be adopted in which the power storage unit 92 can be discharged, and, for example, the second discharge unit 12 may also be constituted by a DC-DC converter.

In the above embodiments, the second threshold voltage Vth2 is the same as the first threshold voltage Vth1, but may be higher or lower than the first threshold voltage Vth1 as long as it is a voltage higher than 0 V, lower than the output voltage of the power source unit 90, and lower than the output voltage of the power storage unit 92.

In the above embodiments, a time lag from when a failure state is detected until when a control signal is output is set shorter for the second control unit 24 than for the first control unit 22, but it may be about the same, or it may be longer for the second control unit 24.

The invention claimed is:

1. An in-vehicle backup power source control apparatus that controls power supply from a power storage unit that is an in-vehicle battery, in an in-vehicle power source system that includes a power source unit and the power storage unit and in which power from the power source unit is supplied to a power supply target via a power path, the apparatus comprising:
   a first discharge unit that performs a first discharge operation of supplying a discharge current that is based on power supply from the power storage unit, to the power path via a first discharge path;
   a second discharge unit that performs a second discharge operation of supplying a discharge current that is based on power supply from the power storage unit, toward the power supply target via a second discharge path that is different from the first discharge path;
   a first control unit that causes the first discharge unit to perform the first discharge operation only when power supply that is based on the power source unit enters a failure state; and
   a second control unit that causes the second discharge unit to perform the second discharge operation only when power supply that is based on the power source unit enters the failure state or the first discharge operation performed by the first discharge unit is in an abnormal state,
   a switch unit that is disposed on the power path and interposed between a connection portion of the first discharge path and the power supply target,
   wherein the switch unit switches between an on-state and an off-state, and permits power supply from the power source unit side to the power supply target side in the on-state, and shuts off power supply from the power source unit side to the power supply target side in the off-state,
   the second discharge path is electrically connected on the power supply target side relative to the switch unit on the power path, and
   wherein the second control unit is connected to the power path at a node interposed between the connection portion and the switch unit so as to detect the discharge current from the first discharge unit and power supply from the power source unit; and
   wherein the second control unit switches the switch unit to the off-state only when power supply that is based on the power source unit enters the failure state and at least the first discharge operation that is performed by the first discharge unit is in the abnormal state.

2. The in-vehicle backup power source control apparatus according to claim 1, wherein the first control unit and the second control unit operate independently from each other.

3. The in-vehicle backup power source control apparatus according to claim 1, further comprising:
   a capacitor that is electrically connected to the power path, and is charged based on power supplied from the power source unit.

4. The in-vehicle backup power source control apparatus according to claim 1, further comprising:
   a low-dropout regulator that has one end electrically connected to the power storage unit and another end electrically connected to the power path, and that steps down an input voltage that depends on a charging voltage of the power storage unit and applies an output voltage to the power path, when power supply that is based on the power source unit enters the failure state.

5. An in-vehicle backup power source apparatus comprising:
   the in-vehicle backup power source control apparatus according to claim 1; and
   the power storage unit.

6. An in-vehicle backup power source control apparatus that controls power supply from a power storage unit that is an in-vehicle battery, in an in-vehicle power source system that includes a power source unit and the power storage unit and in which power from the power source unit is supplied to a power supply target via a power path, the apparatus comprising:
   a first discharge unit that performs a first discharge operation of supplying a discharge current that is based on power supply from the power storage unit, to the power path via a first discharge path;
   a second discharge unit that performs a second discharge operation of supplying a discharge current that is based on power supply from the power storage unit, toward the power supply target via a second discharge path that is different from the first discharge path;
   a first control unit that causes the first discharge unit to perform the first discharge operation only when power supply that is based on the power source unit enters a failure state; and
   a second control unit that causes the second discharge unit to perform the second discharge operation only when power supply that is based on the power source unit enters the failure state or the first discharge operation performed by the first discharge unit is in an abnormal state,
   a switch unit that is disposed on the power path and interposed between a connection portion of the first discharge path and the power supply target,
   wherein the switch unit switches between an on-state and an off-state, and permits power supply from the power source unit side to the power supply target side in the on-state, and shuts off power supply from the power source unit side to the power supply target side in the off-state,
   the second discharge path is electrically connected on the power supply target side relative to the switch unit on the power path, and
   wherein the second control unit is connected to the power path at a node interposed between the connection portion and the switch unit so as to detect the discharge current from the first discharge unit and power supply from the power source unit; and
   wherein the second control unit switches the switch unit to the off-state only when power supply that is based on the power source unit enters the failure and causes the second discharge unit to start the second discharge operation before the first discharge unit starts the first discharge operation in accordance with control performed by the first control unit.

7. An in-vehicle backup power source control apparatus that controls power supply from a power storage unit that is an in-vehicle battery, in an in-vehicle power source system that includes a power source unit and the power storage unit and in which power from the power source unit is supplied to a power supply target via a power path, the apparatus comprising:
   a first discharge unit that performs a first discharge operation of supplying a discharge current that is based on power supply from the power storage unit, to the power path via a first discharge path;

a second discharge unit that performs a second discharge operation of supplying a discharge current that is based on power supply from the power storage unit, toward the power supply target via a second discharge path that is different from the first discharge path;

a first control unit that causes the first discharge unit to perform the first discharge operation only when power supply that is based on the power source unit enters a failure state; and a second control unit that causes the second discharge unit to perform the second discharge operation only when power supply that is based on the power source unit enters the failure state or the first discharge operation performed by the first discharge unit is in an abnormal state, a switch unit that is disposed on the power path and interposed between a connection portion of the first discharge path and the power supply target, wherein the switch unit switches between an on-state and an off-state, and permits power supply from the power source unit side to the power supply target side in the on-state, and shuts off power supply from the power source unit side to the power supply target side in the off-state, the second discharge path is electrically connected on the power supply target side relative to the switch unit on the power path, and wherein the second control unit is connected to the power path at a node interposed between the connection portion and the switch unit so as to detect the discharge current from the first discharge unit and power supply from the power source unit; and wherein the second control unit switches the switch unit to the off-state only when power supply that is based on the power source unit enters the failure state; and wherein the first discharge unit is a voltage conversion unit that steps up or down an input voltage that depends on a charging voltage of the power storage unit, and applies a predetermined output voltage to the first discharge path; and the second discharge unit is a switch that permits conduction from the power storage unit side to the power supply target side in an on-state, and shuts off conduction from the power storage unit to the power supply target in an off-state; and the second control unit causes the second discharge unit to start the second discharge operation when power supply that is based on the power source unit enters the failure state, and stops the second discharge operation when the first discharge unit starts the first discharge operation during the second discharge operation.

\* \* \* \* \*